United States Patent
Kale et al.

(10) Patent No.: US 11,711,488 B2
(45) Date of Patent: Jul. 25, 2023

(54) CONFIGURABLE STORAGE GRANULARITY FOR VIDEO/IMAGE RECORDING

(71) Applicant: Micron Technology, Inc., Boise, ID (US)

(72) Inventors: Poorna Kale, Folsom, CA (US); Christopher Joseph Bueb, Folsom, CA (US); Te-Chang Lin, New Taipei (TW); Qi Dong, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/463,408

(22) Filed: Aug. 31, 2021

(65) Prior Publication Data

US 2023/0061879 A1    Mar. 2, 2023

(51) Int. Cl.
| | |
|---|---|
| *H04N 5/77* | (2006.01) |
| *G06F 12/1009* | (2016.01) |
| *H04N 5/91* | (2006.01) |
| *H04N 7/18* | (2006.01) |
| *G06F 3/0484* | (2022.01) |

(52) U.S. Cl.
CPC .......... *H04N 5/77* (2013.01); *G06F 12/1009* (2013.01); *H04N 5/91* (2013.01); *H04N 7/183* (2013.01); *G06F 3/0484* (2013.01); *G06F 2212/657* (2013.01)

(58) Field of Classification Search
None
See application file for complete search history.

(56) References Cited

U.S. PATENT DOCUMENTS

| | | | |
|---|---|---|---|
| 8,019,925 B1* | 9/2011 | Vogan | G06F 12/04 711/202 |
| 10,069,909 B1* | 9/2018 | Chopra | G06F 11/1464 |
| 2006/0117161 A1* | 6/2006 | Venturi | G06F 3/0632 711/171 |
| 2014/0218767 A1* | 8/2014 | Hamaguchi | H04N 1/0097 358/1.16 |
| 2017/0295218 A1* | 10/2017 | Shanmugam | H04L 43/0894 |
| 2017/0336981 A1* | 11/2017 | Garcia | G06F 3/0679 |
| 2019/0074283 A1* | 3/2019 | Amaki | H01L 27/1157 |
| 2019/0114272 A1* | 4/2019 | Dubey | G06F 12/0246 |
| 2020/0057578 A1* | 2/2020 | Benisty | G06F 3/0619 |

* cited by examiner

*Primary Examiner* — Hung Q Dang
(74) *Attorney, Agent, or Firm* — Greenberg Traurig (57) ABSTRACT

A memory system having multiple address tables to translate logical addresses to physical addresses at different granularity levels is disclosed. For example, a first address table is associated with a first block size of translating logical addresses for accessing system files and application files; and a second address table is associated with a second block size of translating logical addresses for storing and/or retrieving data from an image sensor of a surveillance camera. A user interface can be used to access a configuration option to specify the second block size; and a user may indicate a typical size of an image or video file to be recorded by the surveillance camera to calculate the second block size and thus configure the second address table for a partition to record the image or video files.

16 Claims, 6 Drawing Sheets

CONFIGURABLE STORAGE GRANULARITY FOR VIDEO/IMAGE RECORDING

TECHNICAL FIELD

At least some embodiments disclosed herein relate to memory systems in general and more particularly, but not limited to techniques to control write operations in memory systems.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The embodiments are illustrated by way of example and not limitation in the figures of the accompanying drawings in which like references indicate similar elements.

DETAILED DESCRIPTION

At least some aspects of the present disclosure are directed to a memory sub-system with techniques to control the granularity of write operations, according to a user configurable option, in a portion of the memory sub-system that is used to record image data or video data from an image sensor of a digital camera, independent of the granularity of other types of data.

A conventional storage device can read or write blocks of data according to a predetermined granularity or size. A host system of the storage device sends read or write requests to the storage device for blocks of data according to the predetermined granularity or block size. The block size corresponds to a minimum amount of data that can be addressed by the host system in a read or write request. In response to a write request from the host system, the storage device can perform a sequence of write operations to write data of the block size into a non-volatile storage medium, such as memory cells formed on an integrated circuit die. The execution of the write requests is successful when the entire block of data of the block size has been written, programmed, or committed into a non-volatile storage medium. When any portion of the block of the size has failed to be committed into the non-volatile storage medium, the execution of the write requests is incomplete or has failed. The host system specifies the location of a block of data using a logical address of the block. The storage device uses a logical to physical address table to translate the logical address specified in a read or write requests into physical addresses of memory cells where the read or write operations for the data are performed. The logical to physical address table translates logical addresses for data blocks of the predetermined granularity or block size. The block size is usually configured at the granularity between 512 B to 1 KB. Such a granularity for writing data into a storage device works well for system files and application software. However, it does not work well for video/image files that are typically larger than 1 MB. When a large amount of data is broken into many blocks according to a relatively small granularity or block size, the writing of the data into the storage device can be specified via a set of write requests that may appear to be random writes of unrelated data during the execution of the write requests. When the write requests are executed as for unrelated data, the write requests can result in the data blocks being written into random groups of memory cells. When a surveillance camera frequently write new images or videos over the storage spaces used for previously recorded images and videos, random writes can lead to high write amplification and reduced endurance of the storage medium.

At least some aspects of the present disclosure address the above and other deficiencies and/or challenges by configuring a storage device to perform logical to physical address translation using different granularities for different types of data. For example, a user can be offered to set a configurable option for a memory region, partition or namespace for the recording of video and/or image data from the image sensor of a security camera. The configurable option can be used to indicate the typical file size of recorded videos and/or images. The storage device is configured to use the information to set the granularity of the logical to physical address translation performed for the storing and accessing of videos and/or images from the image sensor. The configurable option specified for the recording of videos and/or images does not change the granularity of logical to physical address translation for the storing and accessing of other types of data, such as firmware, applications, activity logs, etc. Optionally, the configuration option can be a one-time programmable option. For example, after the configuration option is specified at the beginning of deploying the security camera, or the initial recording of images/videos into a storage device, the configuration option cannot be further changed or adjusted. Alternatively, the granularity option for recording of video/image data can be adjustable after the initial setting. For example, after erasing the previously recorded video/image content in a partition or namespace, the partition or namespace configured for video/image recording can be reconfigured with a different, adjusted granularity for subsequent recording. In one embodiment, the storage device is initially configured with has a default logical to physical address table at a default granularity (e.g., between 512 B to 1 KB). When a user specifies a different granularity for the recording of video and/or image data, the storage device generates an additional logical to physical address table (e.g., for a separate partition or namespace) to track the storage of video/image files at a granularity much bigger than what is used in the default logical to physical address table. The two tables can be used in a same period of time for different types of data. Optionally, the storage device can monitor the storage usage pattern by the image sensor in the security camera to determine an optimal block size for the video/images and reconfigure the video/image partition's granularity to optimize performance, write amplification, and/or endurance. For example, the storage device can automatically create a new namespace with a new granularity, migrate the data from the old namespace to the new namespace, and the replace the old namespace with the new namespace.

Examples of storage devices and memory modules as memory sub-systems are described below in conjunction with FIG. 4. In general, a host system can utilize a memory sub-system that includes one or more components, such as memory devices that store data. The host system can provide data to be stored at the memory sub-system and can request data to be retrieved from the memory sub-system.

Figure 1:
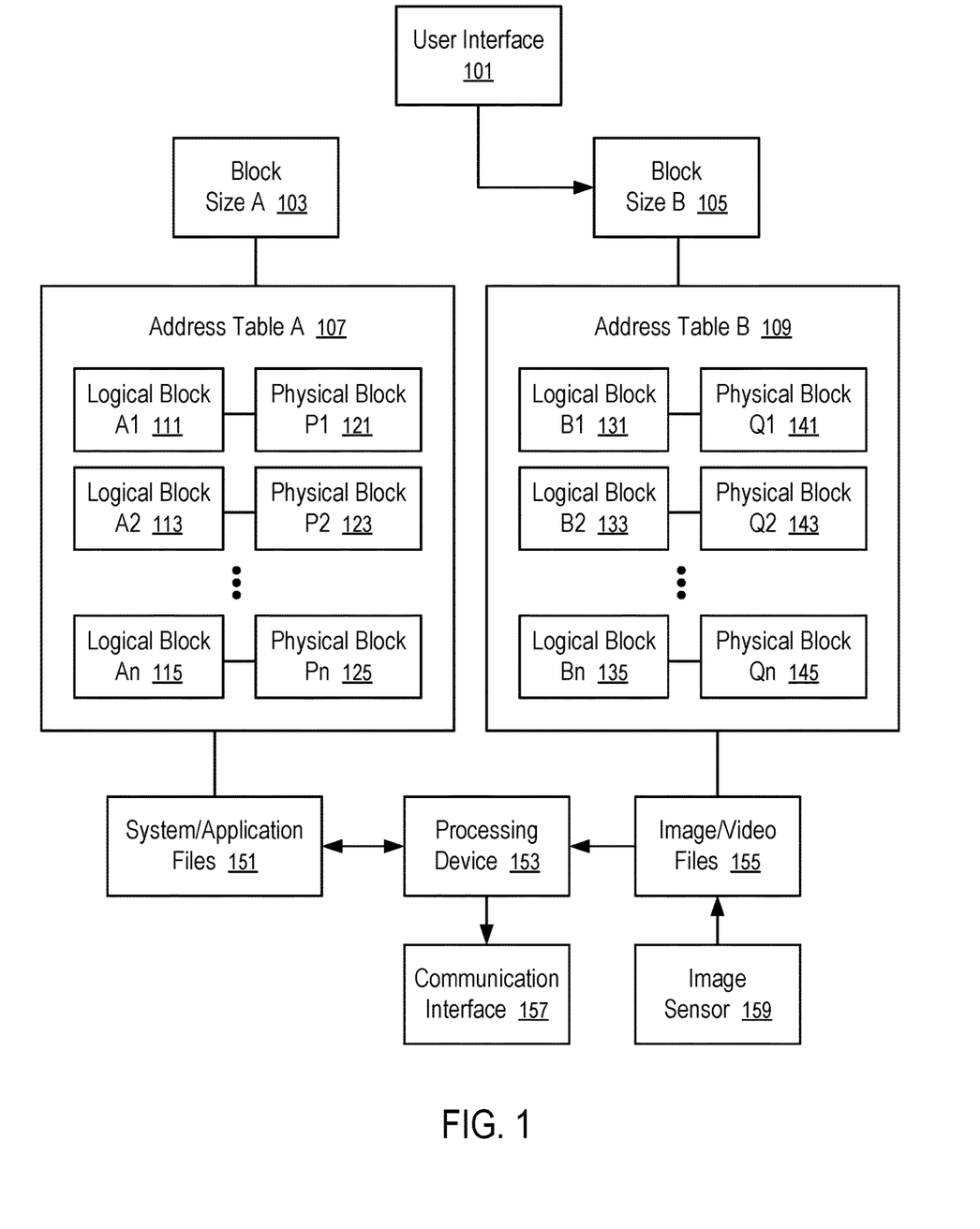
FIG. 1 shows a technique to customize storage granularity in recording data from an image sensor according to one embodiment.

FIG. 1 shows a technique to customize storage granularity in recording data from an image sensor according to one embodiment.

In FIG. 1, an image sensor 159 is configured to generate images files and/or video files 155. The images files and/or video files 155 are stored according to an address table 109 having a block size 105. The same device can store system files and/or application files 151 according to another address table 107 having a different block size 103.

A user interface 101 is provided to specify the block size 105. For example, the user interface 101 can request a user to identify a typical size of an image file or video file 155 generated by the image sensor 159. Based on the typical file size identified in the user interface 101, the block size 105 can be calculated using a predetermined formula to reduce random writes and write amplification associated with frequent write and rewrite of the image files or video files in a storage device.

The address table 109 has data specifying the mapping between a logical block (e.g., 131, 133, . . . , or 135) and a physical block (e.g., 141, 143, . . . , 145). The image sensor 159 can specify an address of a logical block (e.g., 131) for storing a block of data of an image file or a video file 155. The address table 109 specifies the addresses for a physical block (e.g., 141) of memory to store the block of data of the block size 105.

Figure 5:
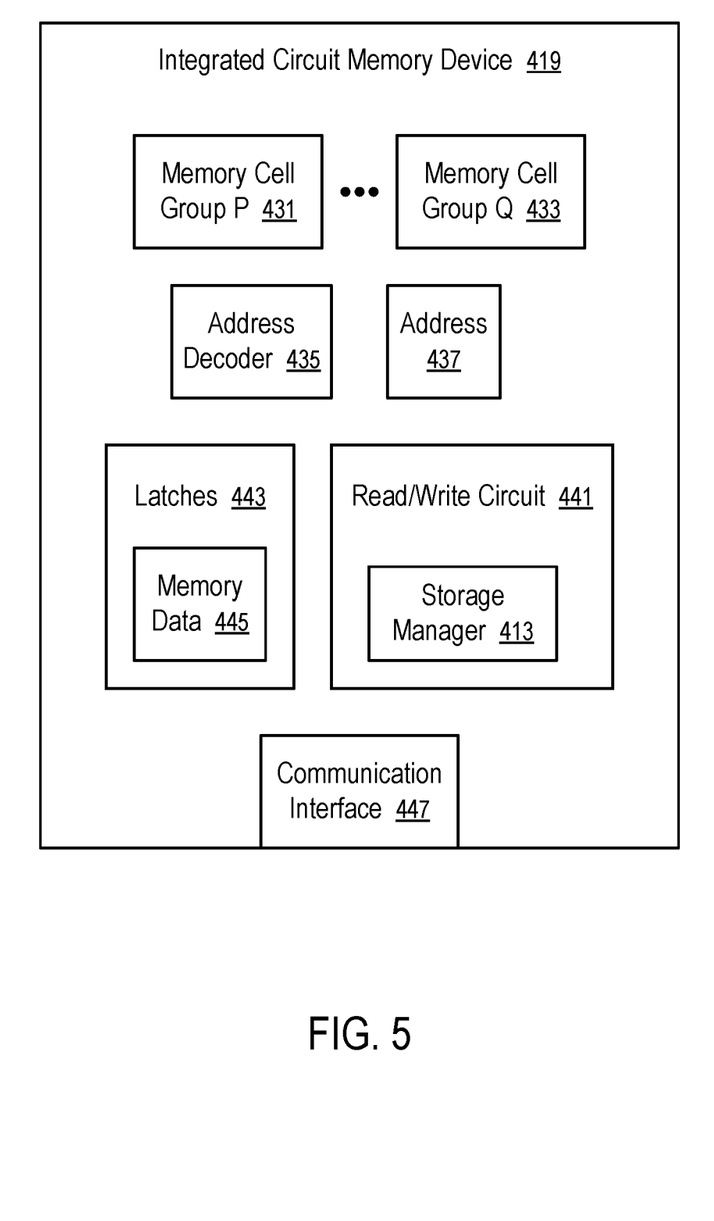
FIG. 5 illustrates an integrated circuit memory device configured according to one embodiment.

For example, the memory of the storage device can be formed as memory cells on an integrated circuit memory device (e.g., 419 in FIG. 5). The memory cells on the memory device (e.g., 419) can be configured to have structures of pages and block, where a page of memory cells is a smallest unit of memory cells that can be programmed in one operation, and a blocks of multiple pages of memory cells is a smallest unit of memory cells that can be erased without erasing other memory cells. Thus, a physical block 141 can include multiple pages that may be in multiple blocks. The mapping of the logical block 131 to the physical block 141 can be constructed to reduce the erasing of data not in the physical block 141 and thus reduce write amplification.

The address table 107 maps logical blocks (e.g., 111, 113, . . . , 115) to physical blocks (121, 123, . . . , 125) in a similar way, but according to a different block size 103. Typically, the block size 105 for the image files and/or video files 155 is configured to be larger than the block size 103 for the system files 151 and/or application files 151.

In some implementations, the image sensor 159 includes a logic circuit to generate the write requests for the image files or video files 155 with logical addresses configured according to the block size 105.

Figure 4:
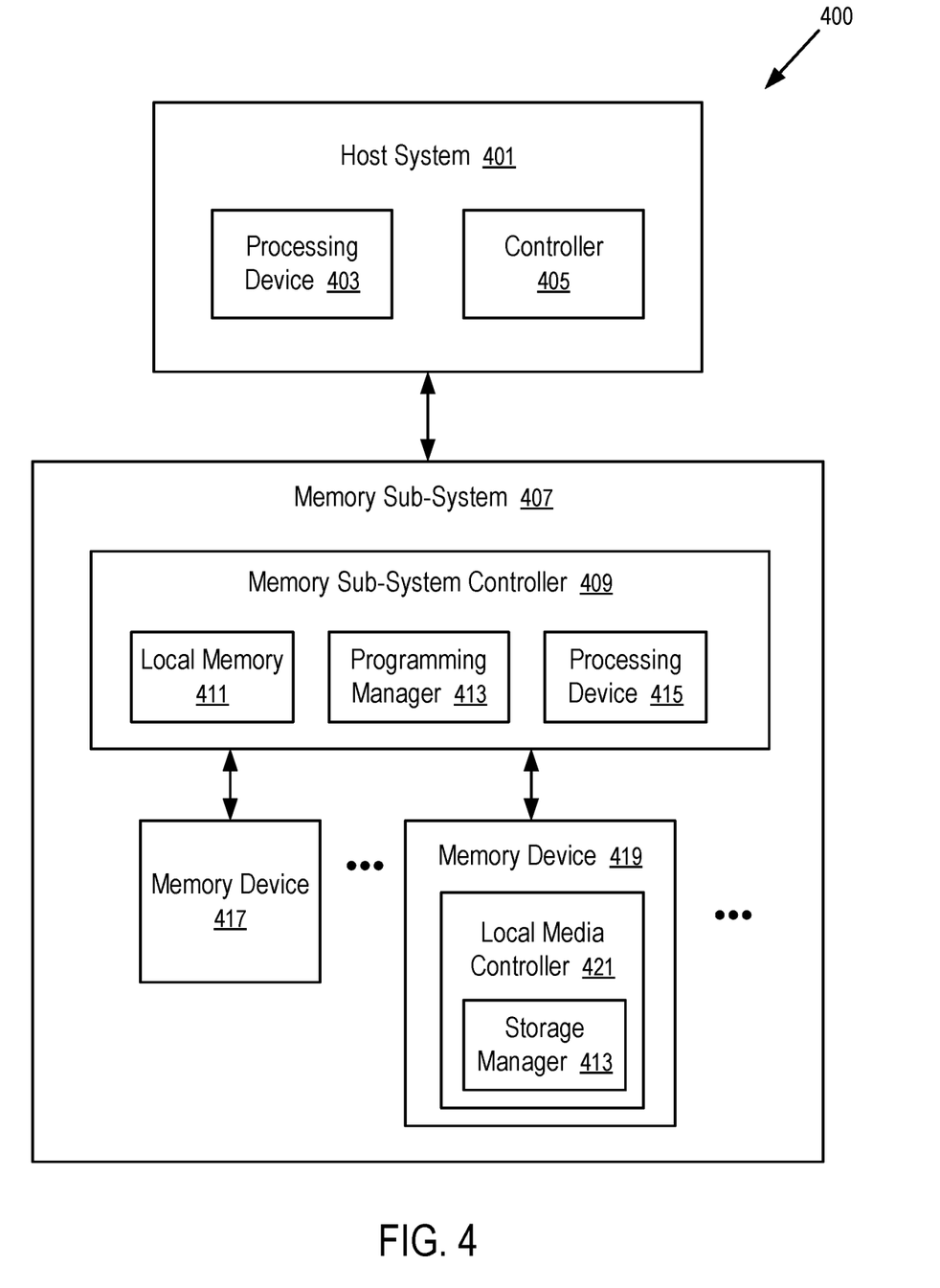
FIG. 4 illustrates an example computing system having a memory sub-system in accordance with some embodiments of the present disclosure.

Alternatively, the image sensor 159 can provide the data/content of the image files or video files 155 to the processing device 153, which generates write requests according to the block size 105 as a host system of a storage device (e.g., a memory sub-system 407 of FIG. 4).

Figure 2:
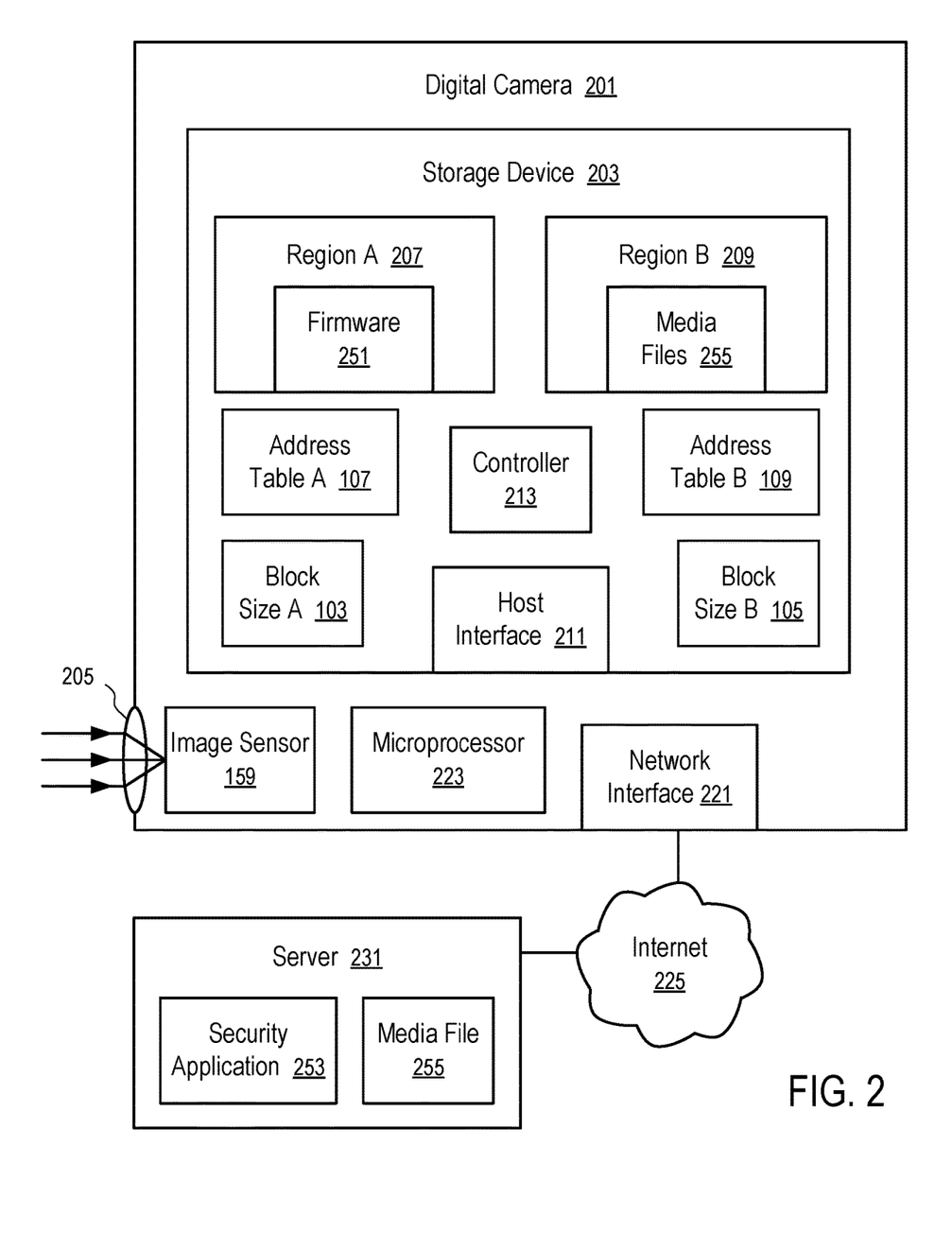
FIG. 2 shows a digital camera with a storage device having a customizable storage granularity for media files according to one embodiment.

The processing device 153 can be configured via instructions included in the system files 151 and/or applications files to perform operations, such as processing the image files and/or video files 155, operating the image sensor 159, communicating an image file or a video file 155 to a remote server via a communication interface 157, as illustrated in FIG. 2.

FIG. 2 shows a digital camera 201 with a storage device 203 having a customizable storage granularity for media files according to one embodiment.

In FIG. 2, the storage device 203 is configured with two regions 207 and 209. For example, each of the regions (207 and 209) can be configured as a partition or a namespace of the storage capacity of the storage device 203. The physical blocks (e.g., 141, 143, . . . , 145; or 121, 123, . . . , 125) specify the locations of memory cells corresponding to the region (e.g., 207; or 209).

For example, the region 209 having a relatively large block size 105 can be used to store media files 255 containing data generated by the image sensor 159. The region 207 having a relatively small block size 103 can be used to store other files, such as firmware 251, system files and/or application files 151.

As in FIG. 1, the address table 109 has granularity corresponding to the block size 105; and the address table 107 has granularity corresponding to the block size 103.

The storage device 203 has a controller 213 configured (e.g., via firmware and/or logic circuit) to perform address translation using the different address tables 107 and 109 having different block sizes 103 and 105.

The digital camera 201 can include a lens 205, a microprocessor 223, a network interface 221, and the storage device 203. The microprocessor 223 can be configured via instructions in the system files and/or application files 151 stored in the region 207; and the image files and/or video files 155 generated by the image sensor 159 and/or the microprocessor 223 are written into the region 209.

When the controller 213 determines that a write request has a logical address in the region 209, the controller 213 uses the address table 109 to perform translation into physical addresses according to the block size 105.

Similarly, when the controller 213 determines that a write request has a logical address in the region 207, the controller 213 uses the address table 107 to perform translation into physical addresses according to the block size 103.

The system files and/or application files 151 stored in the region 207 can include instructions executable by the microprocessor 223 to present a user interface 101 to specify the block size 105.

For example, in some implementations, the user interface 101 can be accessed via a network interface 221 of the digital camera 201 to receive an indication of the block size 105, such as a typical size of an image file or a video file 155 recorded into the storage device 203. Alternatively, another interface, such as a universal serial bus (USB) interface, can be used to connect the digital camera 201 to a computer to present the user interface 101.

In some implementations, the storage device 203 is a removable storage device 203. The storage device 203 can be attached to a computer to set the block size 105 (e.g., using an application running in the computer) before attached into the digital camera 201 (e.g., via a media slot configured on the digital camera 201).

The digital camera 201 can be connected through the Internet 225 (or a local area network, or an intranet) to a server 231 to implement a surveillance application.

For example, the server 231 can include a security application 253 to retrieve a media file 255 from the storage device 203 in response to certain conditions detected at the digital camera 201 and/or other devices. The media file 255 can include an image file or a video file 155 stored in the region 209 having a large block size 105.

Optionally, the server 231 can monitor the typical file size of the media files 255 stored in the region 209, such as the image files and/or video files generated from the data provided by the image sensor 159. Based on the typical file size, the server 231 can select a block size 105 and instruct the storage device 203 to transition to the use of a different block size for the recording of media files 255.

For example, after the erasure of the files in the region 209, the microprocessor 223 and/or the controller 213 can reconfigure the address table 109 using an alternative block size.

In another example, the microprocessor 223 and/or the controller 213 can create a separate address table for a new block size and generate a mapping between the logical addresses associated with the address table 109 of the old block size 105 and the logical addresses associated with the new block size. The mapping table allows the concurrent use of the old block size 105 and the new block size during migration to the new block size. Upon completion of the migration, the mapping table and the address table 109 having the old block size 105 can be deleted.

Figure 3:
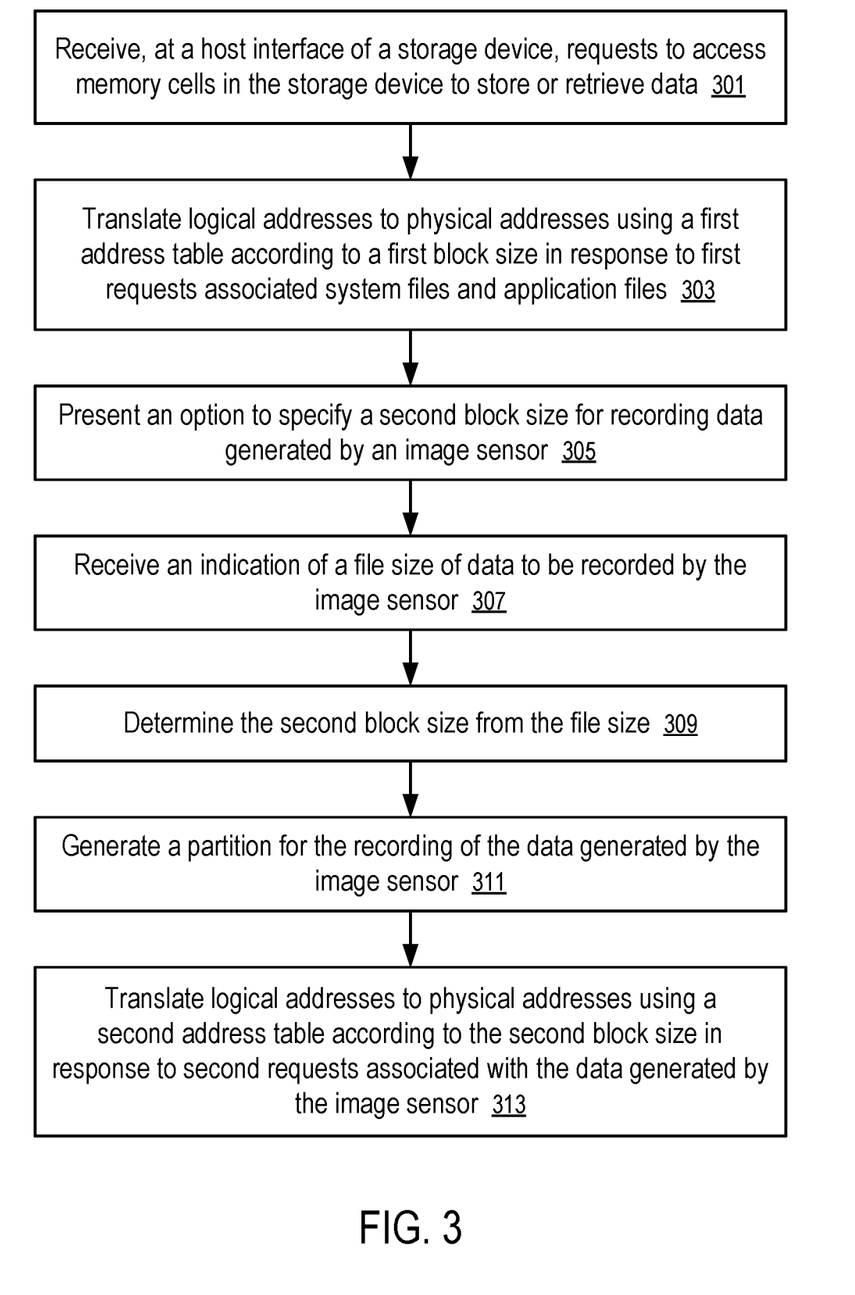
FIG. 3 shows a method to customize storage granularity according to one embodiment.

FIG. 3 shows a method to customize storage granularity according to one embodiment. The methods can be performed by processing logic that can include hardware (e.g., processing device, circuitry, dedicated logic, programmable logic, microcode, hardware of a device, integrated circuit, etc.), software/firmware (e.g., instructions run or executed on a processing device), or a combination thereof. In some embodiments, the method is performed at least in part by the controller 409 of FIG. 4, processing logic in the memory device 419 of FIG. 5, and/or the processing device 403 of the host system 401 of FIG. 4. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

For example, the method of FIG. 3 can be implemented via a storage manager (e.g., 413) in a digital camera 201 and/or its storage device 203 of FIG. 2, with the address mapping technique of FIG. 1.

At block 301, the storage device 203 receives, at a host interface 211, requests to access memory cells in the storage device 203 to store or retrieve data.

For example, the data can include firmware 251 to operate the digital camera 201, system files and/or application files 151 of the digital camera 201, etc. Further the data can include media files 255 created by the image sensor 159 of the digital camera 201 recording image files and/or video files 155.

At block 303, the storage device 203 translates logical addresses to physical addresses using a first address table 107 according to a first block size 103 in response to first requests associated system files and application files 151. Such files typically have a small size when compared to the image files and video files 155 generated by recording using the image sensor 159.

At block 305, an option is presented to specify a second block size 105 for recording data generated by the image sensor 159.

For example, the configuration option can be presented via a user interface 101 in setting up the digital camera 201 for monitoring an area of interest. Optionally, the user interface 101 can be accessed via a network connection made through the network interface 221 of the digital camera 201, and/or via connecting the digital camera 201 and/or the storage device 203 to a computer.

At block 307, the storage manager (e.g., 413) receives an indication of a file size of data to be recorded by the image sensor 159. The file size can be dependent on the configuration of the surveillance operations of the digital camera 201 and/or the security application 253 in a server 231 that uses the digital camera 201. The file size can be a function of resolution of image files, duration of video clip recording, etc.

At block 309, the storage manager (e.g., 413) determines the second block size 105 from the file size.

At block 311, the storage manager (e.g., 413) generates a partition for the recording of the data generated by the image sensor.

At block 313, the storage device 203 translates logical addresses to physical addresses using a second address table according to the second block size 105 in response to second requests associated with the data generated by the image sensor.

In one implementation, the storage device 203 is initially configured to record the media files in the same partition or namespace (e.g., region 207) as the firmware 251. When the second block size 105 is determine (e.g., via the user interface and/or configuration option), a separate partition or namespace (e.g., region 209) is created for the recording of the media files 255 containing the data from the image sensor 159. The first address table and/or the second address table can be configured in a flash translation layer of the storage device 203.

Alternatively, the storage device 203 is initially configured to have separate partitions or namespaces (e.g., region 207 and region 209) for different types of files; and the region 209 for the recording of the media files 255 can have a default block size 105. When the configuration option leads to a different block size 105 for the recording of data from the image sensor 159, the address table 109 can be reconfigured for new recordings (e.g., after erasing the old media files 255) recorded using the old block size 105.

Optionally, the storage manager (e.g., 413) can monitor the sizes of the media files 255 and determine an optimized block size 105. After the determination of the optimized block size 105, the storage manager (e.g., 413) can reconfigure the region 209 to use a new address table 109 according to the optimized block size 105.

Once the address table 109 is set up to use the block size 105 to access the region 209, the storage device 203 can inform the microprocessor 223 to access the media files 255 in the region 209 using logical addresses configured according to the block size 105.

FIG. 4 illustrates an example computing system 400 that includes a memory sub-system 407 in accordance with some embodiments of the present disclosure. The memory sub-system 407 can include media, such as one or more volatile memory devices (e.g., memory device 417), one or more non-volatile memory devices (e.g., memory device 419), or a combination of such.

A memory sub-system 407 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 400 can be a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or such a computing device that includes memory and a processing device.

The computing system 400 can include a host system 401 that is coupled to one or more memory sub-systems 407. FIG. 4 illustrates one example of a host system 401 coupled to one memory sub-system 407. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 401 can include a processor chipset (e.g., processing device 403) and a software stack executed by the processor chipset. The processor chipset can include one or more cores, one or more caches, a memory controller (e.g., controller 405) (e.g., NVDIMM controller), and a storage protocol controller (e.g., PCIe controller, SATA controller). The host system 401 uses the memory sub-system 407, for example, to write data to the memory sub-system 407 and read data from the memory sub-system 407.

The host system 401 can be coupled to the memory sub-system 407 via a physical host interface. Examples of a physical host interface include, but are not limited to, a serial advanced technology attachment (SATA) interface, a peripheral component interconnect express (PCIe) interface, a universal serial bus (USB) interface, a Fibre Channel, a Serial Attached SCSI (SAS) interface, a double data rate (DDR) memory bus interface, a Small Computer System Interface (SCSI), a dual in-line memory module (DIMM) interface (e.g., DIMM socket interface that supports Double Data Rate (DDR)), an Open NAND Flash Interface (ONFI), a Double Data Rate (DDR) interface, a Low Power Double Data Rate (LPDDR) interface, or any other interface. The physical host interface can be used to transmit data between the host system 401 and the memory sub-system 407. The host system 401 can further utilize an NVM Express (NVMe) interface to access components (e.g., memory devices 419) when the memory sub-system 407 is coupled with the host system 401 by the PCIe interface. The physical host interface can provide an interface for passing control, address, data, and other signals between the memory sub-system 407 and the host system 401. FIG. 4 illustrates a memory sub-system 407 as an example. In general, the host system 401 can access multiple memory sub-systems via a same communication connection, multiple separate communication connections, and/or a combination of communication connections.

The processing device 403 of the host system 401 can be, for example, a microprocessor, a central processing unit (CPU), a processing core of a processor, an execution unit, a System on a Chip (SoC), etc. In some instances, the controller 405 can be referred to as a memory controller, a memory management unit, and/or an initiator. In one example, the controller 405 controls the communications over a bus coupled between the host system 401 and the memory sub-system 407. In general, the controller 405 can send commands or requests to the memory sub-system 407 for desired access to memory devices 419, 417. The controller 405 can further include interface circuitry to communicate with the memory sub-system 407. The interface circuitry can convert responses received from memory sub-system 407 into information for the host system 401.

The controller 405 of the host system 401 can communicate with controller 409 of the memory sub-system 407 to perform operations such as reading data, writing data, or erasing data at the memory devices 419, 417 and other such operations. In some instances, the controller 405 is integrated within the same package of the processing device 403. In other instances, the controller 405 is separate from the package of the processing device 403. The controller 405 and/or the processing device 403 can include hardware such as one or more integrated circuits (ICs) and/or discrete components, a buffer memory, a cache memory, or a combination thereof. The controller 405 and/or the processing device 403 can be a microcontroller, special purpose logic circuitry (e.g., a field programmable gate array (FPGA), an application specific integrated circuit (ASIC), etc.), or another suitable processor.

The memory devices 419, 417 can include any combination of the different types of non-volatile memory components and/or volatile memory components. The volatile memory devices (e.g., memory device 417) can be, but are not limited to, random access memory (RAM), such as dynamic random access memory (DRAM) and synchronous dynamic random access memory (SDRAM).

Some examples of non-volatile memory components include a negative-and (or, NOT AND) (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 419 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 419 can include one or more arrays of memory cells such as SLCs, MLCs, TLCs, QLCs, PLCs, or any combination of such. In some embodiments, a particular memory device can include an SLC portion, an MLC portion, a TLC portion, a QLC portion, and/or a PLC portion of memory cells. The memory cells of the memory devices 419 can be grouped as pages that can refer to a logical unit of the memory device used to store data. With some types of memory (e.g., NAND), pages can be grouped to form blocks.

Although non-volatile memory devices such as 3D cross-point type and NAND type memory (e.g., 2D NAND, 3D NAND) are described, the memory device 419 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 409 (or controller 409 for simplicity) can communicate with the memory devices 419 to perform operations such as reading data, writing data, or erasing data at the memory devices 419 and other such operations (e.g., in response to commands scheduled on a command bus by controller 405). The controller 409 can include hardware such as one or more integrated circuits (ICs) and/or discrete components, a buffer memory, or a combination thereof. The hardware can include digital circuitry with dedicated (e.g., hard-coded) logic to perform the operations described herein. The controller 409 can be a microcontroller, special purpose logic circuitry (e.g., a field programmable gate array (FPGA), an application specific integrated circuit (ASIC), etc.), or another suitable processor.

The controller 409 can include a processing device 415 (e.g., processor) configured to execute instructions stored in a local memory 411. In the illustrated example, the local memory 411 of the controller 409 includes an embedded memory configured to store instructions for performing various processes, operations, logic flows, and routines that control operation of the memory sub-system 407, including handling communications between the memory sub-system 407 and the host system 401.

In some embodiments, the local memory 411 can include memory registers storing memory pointers, fetched data, etc. The local memory 411 can also include read-only memory (ROM) for storing micro-code. While the example memory sub-system 407 in FIG. 4 has been illustrated as including the controller 409, in another embodiment of the present disclosure, a memory sub-system 407 does not include a controller 409, and can instead rely upon external control (e.g., provided by an external host, or by a processor or controller separate from the memory sub-system).

In general, the controller 409 can receive commands or operations from the host system 401 and can convert the commands or operations into instructions or appropriate commands to achieve the desired access to the memory devices 419. The controller 409 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 419. The controller 409 can further include host interface circuitry to communicate with the host system 401 via the physical host interface. The host interface circuitry can convert the commands received from the host system into command instructions to access the memory devices 419 as well as convert responses associated with the memory devices 419 into information for the host system 401.

The memory sub-system 407 can also include additional circuitry or components that are not illustrated. In some embodiments, the memory sub-system 407 can include a cache or buffer (e.g., DRAM) and address circuitry (e.g., a row decoder and a column decoder) that can receive an address from the controller 409 and decode the address to access the memory devices 419.

In some embodiments, the memory devices 419 include local media controllers 421 that operate in conjunction with memory sub-system controller 409 to execute operations on one or more memory cells of the memory devices 419. An external controller (e.g., memory sub-system controller 409) can externally manage the memory device 419 (e.g., perform media management operations on the memory device 419). In some embodiments, a memory device 419 is a managed memory device, which is a raw memory device combined with a local controller (e.g., local media controller 421) for media management within the same memory device package. An example of a managed memory device is a managed NAND (MNAND) device.

The controller 409 and/or a memory device 419 can include a storage manager 413 configured to customize storage granularity. In some embodiments, the controller 409 in the memory sub-system 407 and/or the controller 421 in the memory device 419 can include at least a portion of the storage manager 413. In other embodiments, or in combination, the controller 405 and/or the processing device 403 in the host system 401 includes at least a portion of the storage manager 413. For example, the controller 409, the controller 405, and/or the processing device 403 can include logic circuitry implementing the storage manager 413. For example, the controller 409, or the processing device 403 (e.g., processor) of the host system 401, can be configured to execute instructions stored in memory for performing the operations of the storage manager 413 described herein. In some embodiments, the storage manager 413 is implemented in an integrated circuit chip disposed in the memory sub-system 407. In other embodiments, the storage manager 413 can be part of firmware of the memory sub-system 407, an operating system of the host system 401, a device driver, or an application, or any combination therein.

For example, the storage manager 413 implemented in the controller 409 and/or the controller 421 can be configured via instructions and/or logic circuit to customize storage granularity.

FIG. 5 illustrates an integrated circuit memory device configured according to one embodiment. For example, the memory devices 419 in the memory sub-system 407 of FIG. 4 can be implemented using the integrated circuit memory device 419 of FIG. 5.

The integrated circuit memory device 419 can be enclosed in a single integrated circuit package. The integrated circuit memory device 419 includes multiple groups 431, . . . , 433 of memory cells that can be formed in one or more integrated circuit dies. A typical memory cell in a group 431 (or group 433) can be programmed to store one or more bits of data.

Some of the memory cells in the integrated circuit memory device 419 can be configured to be operated together for a particular type of operations. For example, memory cells on an integrated circuit die can be organized in planes, blocks, and pages. A plane contains multiple blocks; a block contains multiple pages; and a page can have multiple strings of memory cells. For example, an integrated circuit die can be the smallest unit that can independently execute commands or report status; identical, concurrent operations can be executed in parallel on multiple planes in an integrated circuit die; a block can be the smallest unit to perform an erase operation; and a page can be the smallest unit to perform a data program operation (to write data into memory cells). Each string has its memory cells connected to a common bitline; and the control gates of the memory cells at the same positions in the strings in a block or page are connected to a common wordline. Control signals can be applied to wordlines and bitlines to address the individual memory cells.

The integrated circuit memory device 419 has a communication interface 447 to receive a command having an address 437 from the controller 409 of a memory sub-system 407, retrieve memory data 445 from memory cells identified by the memory address 437, and provide at least the memory data 445 as part of a response to the command. Optionally, the memory device 419 may decode the memory data 445 (e.g., using an error-correcting code (ECC) technique) and provide the decoded data as part of a response to the command. An address decoder 435 of the integrated circuit memory device 419 converts the address 437 into control signals to select a group of memory cells in the integrated circuit memory device 419; and a read/write circuit 441 of the integrated circuit memory device 419 performs operations to determine the memory data 445 stored in the memory cells at the address 437.

The integrated circuit memory device 419 has a set of latches 443, or buffers, to hold memory data 445 temporarily while the read/write circuit 441 is programming the threshold voltages of a memory cell group (e.g., 431 or 433) to store data, or evaluating the threshold voltages of a memory cell group (e.g., 431 or 433) to retrieve data.

Figure 6:
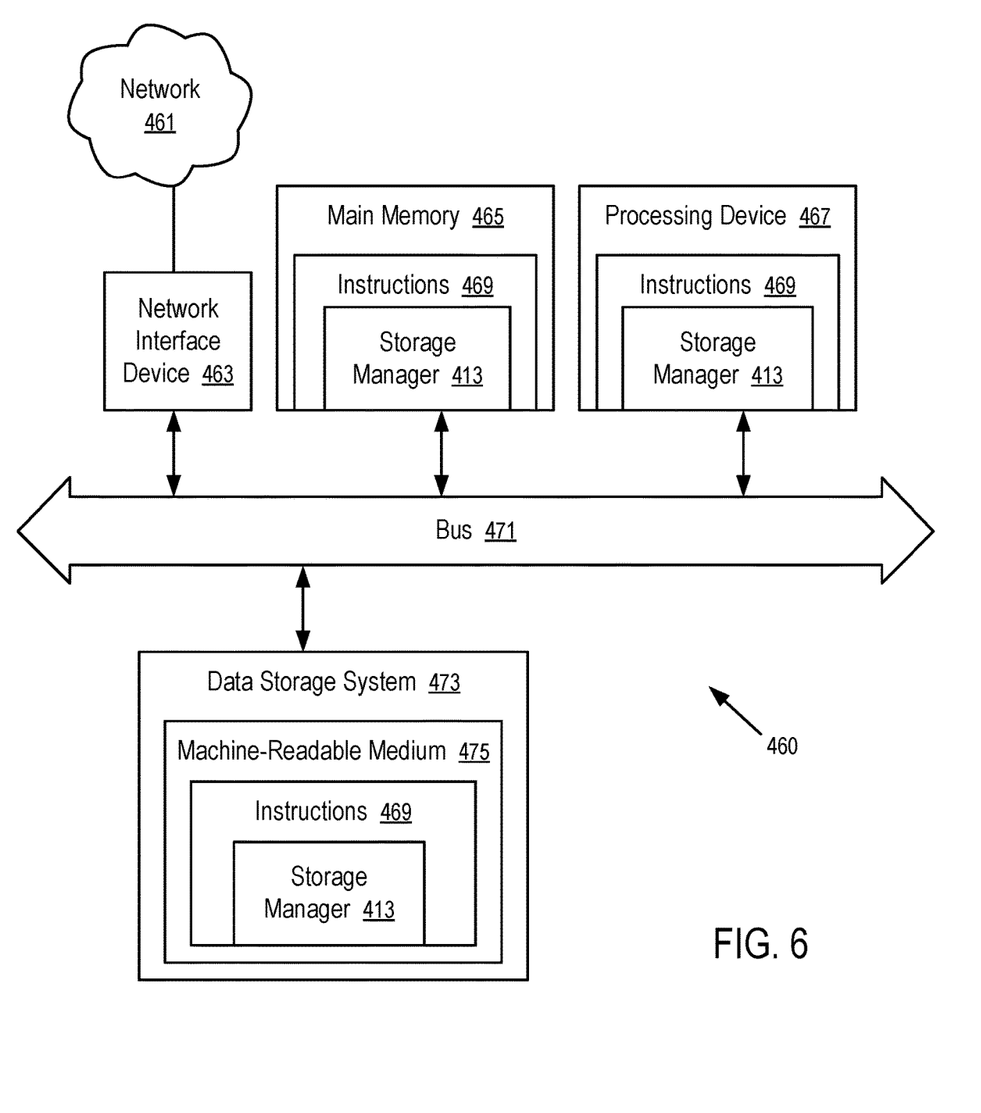
FIG. 6 is a block diagram of an example computer system in which embodiments of the present disclosure can operate.

FIG. 6 illustrates an example machine of a computer system 460 within which a set of instructions, for causing the machine to perform any one or more of the methodologies discussed herein, can be executed. In some embodiments, the computer system 460 can correspond to a host system (e.g., the host system 401 of FIG. 4) that includes, is coupled to, or utilizes a memory sub-system (e.g., the memory sub-system 407 of FIG. 4) or can be used to perform the operations of a storage manager 413 (e.g., to execute instructions to perform operations corresponding to the storage manager 413 described with reference to FIG. 1 to FIG. 5). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 460 includes a processing device 467, a main memory 465 (e.g., read-only memory (ROM), flash memory, dynamic random access memory (DRAM) such as synchronous DRAM (SDRAM) or Rambus DRAM (RDRAM), static random access memory (SRAM), etc.), and a data storage system 473, which communicate with each other via a bus 471 (which can include multiple buses).

The processing device 467 can be one or more general-purpose processing devices such as a microprocessor, a central processing unit, or the like. More particularly, the processing device 467 can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 467 can also be one or more special-purpose processing devices such as an application specific integrated circuit (ASIC), a field programmable gate array (FPGA), a digital signal processor (DSP), network processor, or the like. The processing device 467 is configured to execute instructions 469 for performing the operations and steps discussed herein. The computer system 460 can further include a network interface device 463 to communicate over the network 461.

The data storage system 473 can include a machine-readable medium 475 (also known as a computer-readable medium) on which is stored one or more sets of instructions 469 or software embodying any one or more of the methodologies or functions described herein. The instructions 469 can also reside, completely or at least partially, within the main memory 465 and/or within the processing device 467 during execution thereof by the computer system 460, the main memory 465 and the processing device 467 also constituting machine-readable storage media. The machine-readable medium 475, data storage system 473, and/or main memory 465 can correspond to the memory sub-system 407 of FIG. 4.

In one embodiment, the instructions 469 include instructions to implement functionality corresponding to a storage manager 413 (e.g., the storage manager 413 described with reference to FIG. 1 to FIG. 5). While the machine-readable medium 475 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In this description, various functions and operations are described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A device, comprising:
   memory cells;
   an interface configured to receive write requests to write data to the memory cells;
   a flash translation layer that comprises:
     a first address table associated with a first block size of translating logical addresses specified in a first portion of the write requests into physical addresses;
     a second address table associated with a second block size of translating logical addresses specified in a second portion of the write request into physical addresses;
   a processing device configured to perform address translation according to the first block size and the second block size using the first address table and the second address table respectively; and
   an image sensor configured to generate data to be written into the memory cells according to the second block size, wherein instructions executed by the processing device are accessed according to the first block size, wherein
   the processing device, upon execution of the instructions, is further configured to present a user interface to specify the second block size, wherein the user interface is configured to receive an indication of a representative file size recorded by the image sensor into the memory cells; and the processing device is configured to determine the second block size based on the representative file size.

2. The device of claim 1, wherein the first address table is configured for logical addresses associated with the first region of the memory cells; and the second address table is configured for logical addresses associated with the second region of the memory cells.

3. The device of claim 2, wherein a first partition identifies the first region; a second partition identifies the second region; and logical addresses in the write requests are specified in connection with identifications of the first partition and the second partition.

4. The device of claim 3, wherein each of the first partition and the second partition is a namespace configured on a storage capacity of the memory cells.

5. The device of claim 1, wherein the instructions are further configured to instruct the processing device to determine an average size of files recorded by the image sensor into the memory cells, calculate the second block size, and generate the second address table for logical addresses specified for a partition to record data from the image sensor.

6. A digital camera, comprising:
   an image sensor;
   a microprocessor; and
   a storage device having:
     memory cells;
     a host interface configured to receive write requests from the microprocessor to record image data into the memory cells;
     a first address table configured to translate logical addresses to physical addresses according to a first block size;
     a second address table configured to translate logical addresses to physical addresses according to a second block size; and
     a controller configured to perform address translation using the second address table for requests associated with second data generated by the image sensor and using the first address table for requests associated with first data, wherein the first data is identified via logical addresses associated with a first partition; and the second data is identified via logical addresses associated with a second partition created to record data from the image sensor, and wherein the first data includes instructions, which when executed by the microprocessor, cause the microprocessor to determine an average size of files of data generated by the image sensor and recorded into the memory cells, calculate the second block size, create the second partition, and generate the second address table for logical addresses specified in the second partition to record data generated by the image sensor.

7. The digital camera of claim 6, wherein each of the first partition and the second partition is a namespace allocated on a storage capacity of the memory cells of the storage device.

8. The digital camera of claim 7, wherein the first data includes system files and application files.

9. The digital camera of claim 7, wherein the first data includes instructions, which when executed by the microprocessor, cause presentation of a user interface to specify the second block size.

10. The digital camera of claim 9, further comprising:
a network interface, wherein the user interface is accessible via the network interface.

11. A non-transitory computer storage storing instructions which, when executed by a computing device, cause the computing device to perform a method, comprising:
receiving, at a host interface of a storage device, requests to access memory cells in the storage device to store or retrieve data, including a write request to store data generated by an image sensor;
translating, logical addresses to physical addresses using a first address table according to a first block size in response to first requests not associated with data generated by the image sensor;
translating, logical addresses to physical addresses using a second address table according to a second block size in response to second requests associated with data generated by the image sensor; and
presenting an option to specify the second block size;
receiving an indication of a file size of data recorded by the image sensor; and
determining the second block size from the file size.

12. The non-transitory computer storage of claim 11, wherein the option is presented in a user interface through a communication connection via a network; and the method further comprises:
connecting to a remote server to implement a surveillance application via the image sensor.

13. The non-transitory computer storage of claim 11, wherein the method further comprises, in response to a determination of the file size:
generating a second partition to host data generated by the image sensor, wherein logical addresses specified in requests to read or write data generated by the image sensor are identified to be in the partition; and
generating the second address table for the second partition, wherein a first partition in the storage device is configured to store system files and application files of a digital camera having the image sensor.

14. The non-transitory computer storage of claim 11, wherein the method further comprises:
determining an average size of files of data generated by the image sensor and recorded into the memory cells;
calculating the second block size;
creating a partition for recording data generated by the image sensor; and
generate the second address table for logical addresses specified in the partition.

15. A device, comprising:
memory cells;
an interface configured to receive write requests to write data to the memory cells;
a flash translation layer that comprises:
a first address table associated with a first block size of translating logical addresses specified in a first portion of the write requests into physical addresses;
a second address table associated with a second block size of translating logical addresses specified in a second portion of the write request into physical addresses;
a processing device configured to perform address translation according to the first block size and the second block size using the first address table and the second address table respectively; and
an image sensor configured to generate data to be written into the memory cells according to the second block size, wherein instructions executed by the processing device are accessed according to the first block size, wherein the instructions are further configured to instruct the processing device to determine an average size of files recorded by the image sensor into the memory cells, calculate the second block size, and generate the second address table for logical addresses specified for a partition to record data from the image sensor.

16. A non-transitory computer storage storing instructions which, when executed by a computing device, cause the computing device to perform a method, comprising:
receiving, at a host interface of a storage device, requests to access memory cells in the storage device to store or retrieve data, including a write request to store data generated by an image sensor;
translating, logical addresses to physical addresses using a first address table according to a first block size in response to first requests not associated with data generated by the image sensor;
translating, logical addresses to physical addresses using a second address table according to a second block size in response to second requests associated with data generated by the image sensor;
determining an average size of files of data generated by the image sensor and recorded into the memory cells;
calculating the second block size;
creating a partition for recording data generated by the image sensor; and
generate the second address table for logical addresses specified in the partition.

* * * * *